Sept. 17, 1968  C. P. RICKERD  3,401,513
RECIPROCATING MOWER WITH BALANCED CUTTING ACTION
Filed July 13, 1965  2 Sheets-Sheet 1
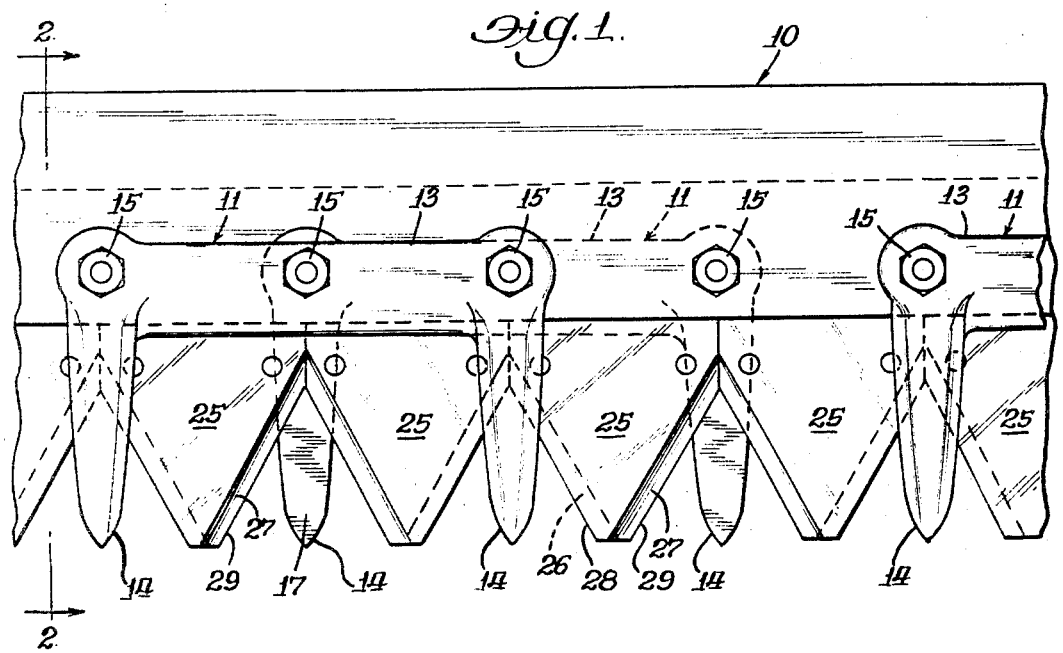
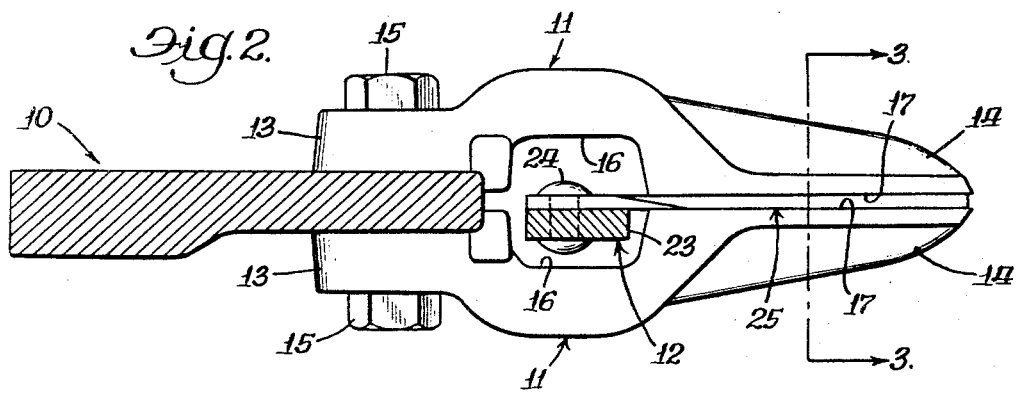
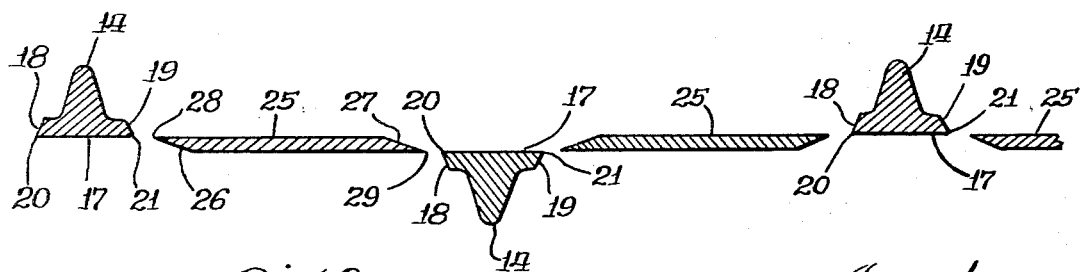
Inventor:
Calvin P. Rickerd
By John J. Kowalik
Atty.

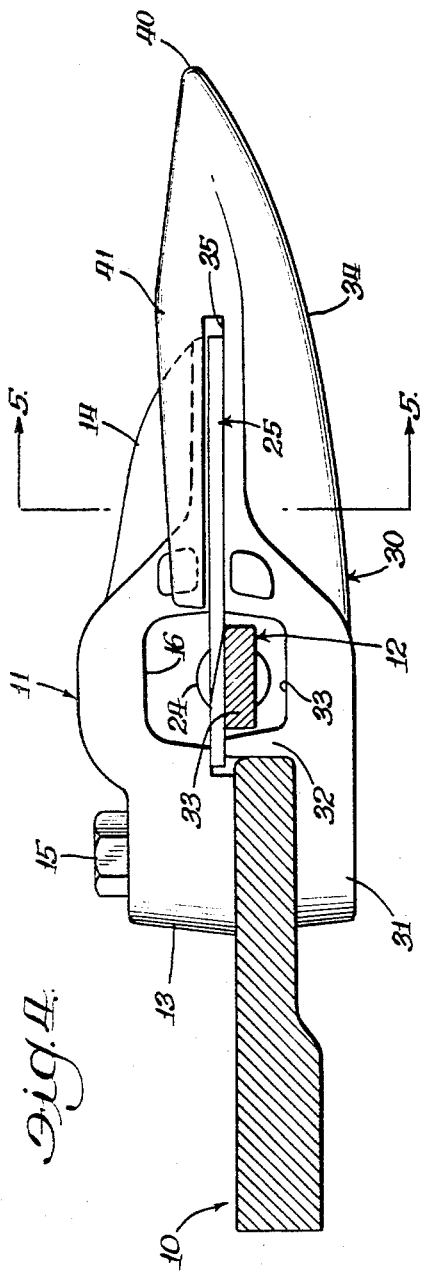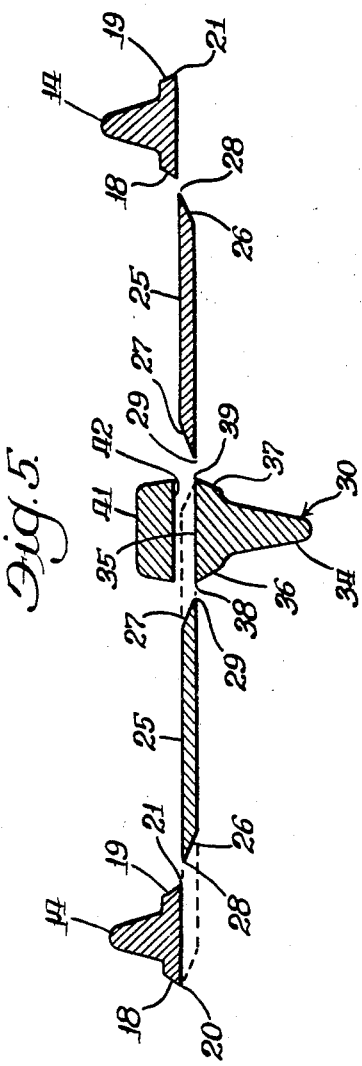

United States Patent Office 3,401,513
Patented Sept. 17, 1968

3,401,513
RECIPROCATING MOWER WITH BALANCED CUTTING ACTION
Calvin P. Rickerd, La Grange Park, Ill., assignor to International Harvester Company, Chicago, Ill., a corporation of New Jersey
Filed July 13, 1965, Ser. No. 471,667
7 Claims. (Cl. 56—298)

ABSTRACT OF THE DISCLOSURE

A mower having a support bar, a sickle reciprocal thereon, upper and lower guards mounted on the bar and receiving the sickle therebetween for cutting coaction therewith, each guard having a pair of fingers and a mounting member therebetween, the upper and lower guards being offset lengthwise of the bar and disposing a finger of each guard between the fingers of the other guard and common means interconnecting adjacent upper and lower guards through the mounting members thereof.

---

This invention relates to mowing apparatus, and more particularly to mowing structure which is adapted to cut through rank growth and/or previously cut material.

In the past it has been well known to provide mowing apparatus with a reciprocally mounted cutter bar having a plurality of generally identical, somewhat triangularly shaped knife sections. Guard members have conventionally been provided for the knife sections, and usually also serve to guide the cutter bar during its reciprocating movement. In such apparatus, each knife section is provided with cutting edges at the forwardly converging sides thereof on one face of the knife section. During use of such a cutter bar, the cutting action has generated a force which tends to move the cutter bar upwardly out of its path of travel. Various types of hold-down means have been proposed in the past to obviate this problem, however, none of these expedients has been fully satisfactory.

In one well known construction, a plurality of laterally spaced guards are provided on a mounting member, and are positioned below the path of movement of the cutter bar to guide the cutter bar during its reciprocating movement. In this structure, it has been conventional to provide a plurality of hold-down clips on the mounting member above the path of travel of the cutter bar to resist the tendency of the cutter bar to move upwardly under the influence of the forces generated by the cutting action. The use of these hold-down clips has not been satisfactory, in that the cutter bar has exhibited a tendency to buckle between the clips, and the movement of the cutter bar relative to the clips has caused them to wear out after a short period of use.

A further expedient which has been proposed in the past is to provide rearwardly extending lip portions on the cutter bar guide members which overlie the slot through which the cutter bar moves to resist upward movement of the cutter bar. This expedient has also proven unsatisfactory in that the upward forces generated by the cutting action have caused the knife sections of the cutter bar to interfere with the guard lip portions. It will be readily understood that this has caused undesirable wearing of the lip portion as well as of the knife sections themselves. Additionally, the relatively large amount of friction between the knife sections and the lip portions has increased the amount of power necessary to reciprocate the cutter bar.

Accordingly, an object of the present invention is to provide a mower structure of the character described which obviates the problems noted above in connection with former constructions.

Another object of the invention is to provide a mower assembly wherein adjacent knife sections of the cutter bar assembly are inverted relative to one another to provide a balanced cutter bar structure.

A related object is to provide a cutter bar assembly as described in the preceding paragraph wherein the cutting edges of each knife section are provided on opposite faces thereof.

A further object of the invention is to provide a mower assembly wherein mower guards are provided on opposite sides of a cutter bar path to confine the cutter bar knife sections for movement therealong, with cutting edges being provided on each of the mower guards.

A related object is to provide a mower assembly as described in the preceding paragraph wherein the mower guards each include a pair of spaced fingers, with the fingers on the upper mower guards being offset from the fingers on the lower mower guards.

Still another object of the invention is to provide a mower structure as described in the preceding paragraph wherein the mower guard fingers are generally coextensive with the cutter bar sections to maximize the exposure of the active cutting edges of the mower assembly.

A still further object of the invention is to provide a mower assembly as described above wherein the need for formerly employed hold-down clips is obviated.

These and other objects of the invention will hereinafter become more fully apparent from the following detailed description taken in connection with the annexed drawings, wherein:

FIG. 1 is a fragmentary plan view of a mower according to the present invention;

FIG. 2 is an enlarged sectional view taken generally along line 2—2 of FIG. 1;

FIG. 3 is a view taken generally along line 3—3 of FIG. 2;

FIG. 4 is a view similar to FIG 2, and showing a modified form of the invention; and FIG. 5 is a sectional view taken generally along line 5—5 of FIG. 4.

Referring now to the drawings, the illustrated embodiments of the mower assembly include an elongate, horizontally extending mounting member 10 having a plurality of upper and lower mower guards 11 secured thereto. Mower guards 11 cooperate to define a planar path of movement for a reciprocally mounted cutting bar assembly 12.

In the embodiment of FIGS. 1–3, each mower guard 11 is generally identical and includes a rear mounting portion 13, and a pair of forwardly extending fingers 14 at opposite ends of the mounting portion 13. Suitable openings are provided at opposite ends of each guard mounting portion, for reception of bolts 15 for securing the mower guards to the mounting member 10. A transverse groove 16 is provided in the mower guard fingers forwardly of the mounting portion 13, and grooves 16 are positioned in alignment, as can be seen in FIG. 2, to define a transverse slideway for the cutter bar assembly 12. Each guard finger 14 has a generally planar guide surface 17 positioned on one side of the plane of movement of the cutter bar knife sections, to guide the cutter bar during its reciprocating movement.

As can be best seen in FIG. 1, the mower guards 11 are spaced laterally along the mounting member 10 at opposite sides thereof. In the embodiment shown in FIG. 1, the fingers 14 of the guards on opposite sides of the path of movement of the cutter bar assembly are offset from one another, so that the adjacent guide surfaces 17 are spaced generally one-half the distance between the fingers on each mower guard 11. Common bolts 15 may be used to secure the opposed mower guards to the support 10, as best seen in FIG. 1.

Each mower guard finger 14 includes sides 18 and 19 which converge toward one another to define cutting edges 20 and 21 respectively, at the junction with guide surface 17. Thus, adjacent fingers 14 provide laterally spaced cutting edges on opposite sides of the path of movement of the cutter bar assembly.

The cutter bar assembly 12 includes a support 23 which is reciprocated in the guideway defined by grooves 16 by conventional means, not shown. A plurality of knife sections 25 are secured to the upper surface of member 23 by rivets 24 or the like. Each knife section is generally identical, and is formed of a relatively thin member having forwardly converting sides. The opposite faces of each knife section are beveled at 26 and 27 adjacent the sides thereof to define cutting edges 28 and 29 at opposite sides of each knife section. Cutting edges 28 cooperate with the cutting edges 20 and 21 on the upper mower guard fingers 14 to effect a cutting action therewith upon reciprocation of the cutter bar assembly 12. In a like manner, the cutting edges 29 cooperate with the cutting edges 20 and 21 on the lower mower guard fingers to effect a cutting action upon reciprocation of the cutter bar assembly 12. It will be readily appreciated that the cutting action between the cutting edges 29 on the knife sections and the guard cutting edges 20 and 21 generates an upward force, and this force is effectively resisted by the guard fingers 14 which are positioned above the path of travel of the knife sections. Likewise, the cutting action between the knife section cutting edges 28 and the guard fingers cutting edges 20 and 21 generates a downward force which is effectively resisted by the lower guard fingers 14. Thus, a substantially balanced cutter bar assembly is provided wherein the knife sections will move between the guard fingers with a minimum amount of friction. This prolongs the useful life of the mower guards and the knife sections, and results in a substantial saving in the amount of power required to reciprocate the cutter bar assembly.

As best seen in FIGS. 1 and 2, the mower guard fingers 14 and the knife sections 25 are substantially coextensive in a fore and aft direction with one another. Thus, the knife section cutting edges are active throughout substantially their entire length, and cutting takes place all the way to the forward end of the mower bar fingers 14.

As best seen in FIG. 3, at least some of the mower guards may be positioned so as to dispose their fingers 14a in alignment with the fingers on the mower guards on the opposite side of the cutter bar path. In such an arrangement, the aligned guard fingers serve as a rock guard to shield the cutter bar knife sections.

Turning now to FIGS. 4 and 5, a slightly modified form of the mower assembly is shown, wherein the support, upper mower guards, and cutter bar assembly are generally identical with those described above. In this embodiment a different form of lower mower guard 30 is alternated with lower mower guards 11 described above. Mower guards 30 include a rear mounting portion 31 secured to the undersurface of support 10. An upwardly extending flange 32 is provided forwardly of mounting portion 31, and defines a transverse groove 33 forwardly thereof which cooperates with the grooves 16 on the superposed mower guards 11 to define a guideway for the cutter bar assembly 12. Guards 30 further include a forwardly extending finger portion 34 having planar upper surfaces 35 for guiding the cutter bar knife sections during reciprocation thereof. The sides 36 and 37 of each guard finger portion 34 converge toward one another, and define cutting edges 38 and 39 at the junction with guide surface 35. The mower guard finger portion 34 converges forwardly to a rounded nose 40 which facilitates movement of the mower assembly through the material to be cut.

A lip portion 41 extends rearwardly from the forward end of the finger portion 34, and includes a generally planar lower surface 42 which is spaced from and parallel with finger surface 35 to define a knife section slot therebetween. Lip portion 41 cooperates with the upper mower guards 11 to effectively confine the knife sections in their horizontal path of movement.

While I have shown and described one embodiment and modification of my invention, it is to be understood that it is capable of many modifications. Change, therefore, in the construction and arrangement may be made without departing from the spirit and scope of the invention as defined in the appended claims.

I claim:

1. A mower assembly comprising:
    a support;
    a cutter bar;
    means mounting said cutter bar on said support for horizontal reciprocation along a predetermined path;
    a plurality of knife sections on said cutter bar and extending forwardly of said support;
    means for guiding said cutter bar during its reciprocation including a plurality of upper guide members each having a mounting member and a pair of guide fingers thereon each providing an upper guide surface above said path and adjacent thereto, a plurality of lower guide members each having a mounting member and a pair of guide fingers thereon each providing a lower guide surface below said path and adjacent thereto, at least some of said upper guide surfaces being substantially coextensive fore and aft with said knife sections, each of said upper guide surfaces cooperating with said lower guide surfaces to confine said cutter bar for movement along said path, means mounting said guide members on said support; and
    means at the side of each guide surface cooperating with at least one knife section to effect a cutting action upon reciprocation of said cutter bar, said cutting action taking place along the length of said at least some upper guide surfaces and to the forward end thereof, adjacent upper and lower guide members being offset lengthwise of the support and one finger of each guide intercalated with the pair of fingers of the other guide and the mounting members of adjacent upper and lower guards having portions superposed with each other, and common means interconnecting said superposed portions to each other and to the support.

2. A mower assembly as defined in claim 1 wherein at least some of said lower guide members extend forwardly of said at least some upper guide surfaces.

3. A mower assembly as defined in claim 2 wherein said at least some lower guide members each include a lip portion overlying the lower guide surface thereon and cooperating with the guide surfaces on the upper guide members to confine said cutter bar for movement along said path.

4. A mower assembly as defined in claim 3 wherein cutting means are provided on opposite sides of each lip portion.

5. A mower assembly as defined in claim 1 wherein each of said guide members is generally identical, so that said upper and lower guide surfaces are substantially coextensive fore and aft of the cutter with said knife sections whereby said cutting action takes place along the length of said guide members and to the forward end thereof.

6. A mower assembly comprising:
    a support;
    a cutter bar having a plurality of knife sections;
    means mounting said cutter bar for reciprocation along a generally planar path;
    means for guiding said cutter bar during its reciprocation including a plurality of lower guide members each having a pair of interconnected spaced fingers, a guide surface on each finger below said path and adjacent thereto, means on each lower guide member finger cooperating with at least one knife section to effect a cutting action upon reciprocation of said cutter bar, said cutting action generating a first force tending to move said cutter bar out of said path, a plurality of upper guide members each having a pair of spaced interconnected fingers, a guide surface on each finger above said path and adjacent thereto, and means on each upper guide member finger cooperating with at least one knife section to effect a cutting action upon reciprocation of said cutter bar, said last mentioned cutting action generating a second force balancing said first force, said upper guide surfaces cooperating with said lower guide surfaces to confine said cutter bar for movement along said plane whereby said cutting action is in shear; and common means mounting said lower and upper guide members on said support in offset relation with respect to one another to position the upper guide member finger between said lower guide member fingers.

7. A mower assembly as defined in claim 6 wherein said guide member fingers extend forwardly of said support, and said knife sections are substantially coextensive with said fingers fore and aft of the mower so that the cutting action takes place along the length of said fingers and to the forward end thereof.

References Cited
UNITED STATES PATENTS

| | | | |
|---|---|---|---|
| 741,642 | 10/1903 | Evans | 56—298 |
| 888,491 | 5/1908 | Hampton | 56—298 |
| 1,789,781 | 1/1931 | Seidel | 56—309 |
| 2,226,583 | 12/1940 | Ronning | 56—308 |

ABRAHAM G. STONE, *Primary Examiner.*

P. A. RAZZANO, *Assistant Examiner.*